United States Patent [19]

Malhotra

[11] Patent Number: 4,837,267

[45] Date of Patent: Jun. 6, 1989

[54] TETRAFLUOROETHYLENE COPOLYMERS

[75] Inventor: Satish C. Malhotra, Parkersburg, W. Va.

[73] Assignee: E. I. Du Pont De Nemours and Company, Wilmington, Del.

[21] Appl. No.: 171,028

[22] Filed: Mar. 21, 1988

[51] Int. Cl.$^4$ .......................................... C08F 259/08
[52] U.S. Cl. .................................... 524/535; 525/276; 525/902
[58] Field of Search ................ 525/276, 902; 524/535

[56] References Cited

U.S. PATENT DOCUMENTS

| | | | |
|---|---|---|---|
| Re. 31,907 | 6/1985 | Poirier | 525/276 |
| 3,142,665 | 7/1964 | Cardinal et al. | 260/92.1 |
| 3,819,594 | 6/1974 | Holmes et al. | 260/87.5 |
| 4,129,618 | 12/1978 | Downer et al. | 260/884 |
| 4,391,940 | 7/1983 | Kuhls et al. | 525/276 |

*Primary Examiner*—Carman J. Seccuro

[57] ABSTRACT

Advantageous modification of non-melt processible, fibrillatible TFE copolymers for past extrusion is possible by including small amounts of perfluoro(n-alkyl vinyl ether) in the shell of the copolymer particle.

4 Claims, No Drawings

TETRAFLUOROETHYLENE COPOLYMERS

FIELD OF THE INVENTION

This invention relates to modified fibrillatible dispersion-produced polytetrafluoroethylenes, and dispersions of them.

BACKGROUND OF THE INVENTION

It is known in the art that polytetrafluoroethylene (PTFE) homopolymer can be modified by including small amounts of recurring units of comonomer. For example, the art discloses a great number of comonomers that can be added to tetrafluoroethylene (TFE) and polymerized to make copolymer without losing the non-melt-processible characteristic of the basic homopolymer of tetrafluoroethylene. Some useful comonomers have been found to be chlorotrifluoroethylene (CClF=CF$_2$ or CTFE), dichlorodifluoroethylene (CClF=CClF or CCl$_2$=CF$_2$), perfluoroalkenes of 3–7 carbon atoms (R$_f$CF=CF$_2$ where R$_f$ is perfluoroalkyl of 1–5 carbons), and perfluoro(n-alkyl vinyl) ethers of 3–7 carbon atoms (R$_f$—O—CF=CF$_2$ where R$_f$ is as already defined).

SUMMARY OF THE INVENTION

It has now been found that if tetrafluoroethylene copolymer particles are constructed in a core-shell configuration where the core contains comonomer units of chlorotrifluoroethylene, dichlorodifluoroethylene, perfluoroalkenes or mixtures thereof; and if the shell of the particles contains perfluoro(n-alkyl vinyl) ether as the comonomer in addition to any of the other above-listed comonomers, the resulting copolymer particles have a lower extrusion pressure relative to copolymer that does not contain the special shell comonomer. Lower extrusion pressure is generally advantageous because it enables the polymer to be used in common past extrusion applications, particularly where high reduction ratios are used.

More particularly, the copolymers of this invention can be generally described as non-melt processible tetrafluoroethylene copolymer particles wherein the total comonomer content in the particle is between 0.001 and 2 weight percent, said copolymer consisting of a core and a shell portion wherein the comonomer in the core comprises recurring units of at least one comonomer selected from the class consisting of chlorotrifluoroethylene, dichlorodifluoroethylene, perfluoroalkenes of 3–7 carbon atoms, and mixtures thereof; and wherein the comonomer in the shell can comprise recurring units of at least one comonomer selected from the class described above and also contains recurring units of perfluoro(n-alkyl vinyl) ether of 3–7 carbon atoms; wherein the recurring units of perfluoro(n-alkyl vinyl) ether comprise between 0.0003 and 0.02 weight percent of the total copolymer particle; and provided that the total amount of comonomer units in the shell by weight is greater than the total amount in the core; and wherein the shell comprises between 5 and 50 weight percent of the particle.

The presence of perfluoro(n-alkyl vinyl) ether units (hereinafter referred to as PAVE) in the shell portion of the polymer particles has been found to lower the extrusion pressure over a similarly comonomer modified tetrafluoroethylene copolymer that does not contain PAVE in the shell. Lower extrusion pressure is generally advantageous because it enables the polymer to be used in high reduction ratio applications. Generally, the copolymers of this invention have extrusion pressures of between 225–400 kg/cm$^2$ (22–39 Mpa) at a reduction ratio of 1600:1 and lubricant levels of 19.2 weight percent. Lower extrusion pressures also permit use of less lubricant for paste extrusion.

DESCRIPTION OF THE INVENTION

The new polymer is produced by the commonly known dispersion process for producing non-melt-fabricable polytetrafluoroethylene, where sufficient dispersing agent is present in the polymerization mixture to cause the newly formed polymer particles to remain in dispersed form in the aqueous polymerization mixture. This aqueous dispersion is one form of the compositions of the invention. The aqueous dispersion can be subjected to agitation or chemical treatment to coagulate the polymer particles and the solid coagulated polymer particles comprise a second form of the product of the invention.

The comonomers are present in the tetrafluoroethylene (TFE) polymer chain in random recurring amounts that are small enough that their presence does not convert the polymer into a melt-processible polymer. Thus, while the presence of the comonomer modifies the polytetrafluoroethylene (PTFE) homopolymer in some property respects, it does not modify the polymer to such an extent that the non-melt-fabricable nature of the polymer is lost, and the new polymer will have a melt viscosity above 1×10$^8$ Pa.S at 380° C.

The copolymers are produced by the dispersion type polymerization process. The comonomers to be in the core are added early in the polymerization either as a precharge, or continuously or intermittently or in some combinations thereof. The PAVE is added after the formation of particle core. The polymerization is carried out generally as described in U.S. Pat. No. 3,142,665 or U.S. Pat. No. 3,391,299. TFE is pressured into an autoclave containing water and conventional non-telogenic free-radical polymerization initiators along with enough paraffin wax to suppress coagulum formation and enough emulsifying agent to maintain the polymer particles in dispersed form. The reaction mixture is agitated mildly and the polymerization is carried out at suitable temperatures such as 50° to 125° C., preferably 50°–100° C., and suitable pressure, such as between 5 and 40 kg/cm$^2$ (0.5 and 3.9 MPa). These temperatures and pressures are representative as neither is of importance. The polymer dispersion can be used as such or can be concentrated to a higher solids content, or can be coagulated by usual techniques to obtain solid polymers.

Particle size in the dispersion can be controlled by known procedures. For example, addition of dispersing agent can be programmed as taught in U.S. Pat. No. 3,391,099 to increase size. Generally, product particle size in the dispersion will be between 0.1 and 0.5 micrometers.

The polymerization initiator may be added as a precharge and/or in increments, or continuously, or in some combination thereof. The initiator can be one or more of any of the usual initiators for TFE polymerization, such as ammonium or potassium persulfate (APS or KPS), disuccinic acid peroxide (DSP), a redox combination of potassium permanganate and the like.

The dispersing agent can be any of the common non-telogenic dispersing agents used in dispersion polymerization of TFE. The amount will be an amount sufficient to stabilize the polymer particles in the dispersion and to keep coagulum formation at a minimum. Ammonium perfluorooctanoate (commonly called C-8) is preferred. C-8 concentrations of 0.1–0.5 weight percent, based on aqueous charge, are normally used.

TESTING INFORMATION

Properties of the polymers and other relevant data obtained concerning the new polymers of this invention are determined according to procedures described as follows:

(1) Determination of Comonomer Content in the Polymer (a) the PPVE content was determined by Fourier Transform (FT) IR spectroscopy. The C—O—C band at 995 $cm^{-1}$ was used. A 0.3 g sample of the polymer was leveled between pieces of aluminum foil in a cylindrical mold, 2.86 cm in inside diameter. A pressure of 140.9 $kg/cm^2$ (13.8 MPa) was applied for one minute at ambient temperature. The pressed sample, which was 0.025 cm thick, was then analyzed by IR. The sample was scanned from 1040 to 877 $cm^{-1}$. A straight base line was drawn from the absorbance minimum at 1010 $cm^{-1}$ to that at 889 $cm^{-}$. The ratio of the absorbance from the base line to the maximum at 995 $cm^{-1}$ to the absorbance from the base line to the maximum at 935 $cm^{-1}$ was obtained. The actual weight percent PPVE was determined from a calibration curve or by multiplying the ratio by the following factor:

| Absorbance Ratio | Factor |
|---|---|
| 0.01 | 0.40 |
| 0.02 | 0.30 |
| 0.04 | 0.25 |
| 0.08 | 0.19 |

(b) The HFP content was determined by FTIR. The ratio of the absorbance at 983 $cm^{-1}$ to that at 935 $cm^{-1}$ was multiplied by a factor of 0.3 to obtain percent HFP by weight.

(c) The CTFE content was determined by FTIR. The C-Cl band at 957 $cm^{-1}$ was used.

(2) Standard Specific Gravity (SSG)

SSG was measured by water displacement of a standard molded test specimen in accordance with ASTM D1457-69. The standard molded part was formed by preforming 12.0 g of the powder in a 2.86 cm diameter die at a pressure of 352 $kg/cm^2$ (35 MPa), followed by the sintering cycle of the preform of heating from 300° C. to 380° C. at 2° C./minute, holding at 380° C. for 30 minutes, cooling to 295° C. at 1° C./minute and holding at this temperature for 25 minutes, after which the specimen was cooled to 23° C. and tested for specific gravity.

(3) Raw Dispersion Particle Size (Average)

Raw Dispersion Particle Size (RDPS) was determined from the absorbance (scattering) of a dilute aqueous sample at 546 millimicrons using a Beckman DU spectrophotometer and is based on the principle that the turbidity of the dispersion increases with increasing particle size, as shown in U.S. Pat. No. 4,036,802.

(4) Extrusion Pressure (Reduction Ratio is equal to 1600:1)

Extrusion pressure was determined in a rheometer by ASTM D1457-81A, section 12.8.

(5) Melt Viscosity

Melt viscosity was calculated by measuring the tensile creep of a sintered piece held at 380° C. specifically, 12 g. of molding powder was placed in a 7.6 cm. diameter mold between 0.152 cm. rubber cauls and paper spacers. Pressure is then slowly applied on the mold until a value of 140.5 $kg./cm^2$ (13.8 MPa) is obtained. This pressure was held for 5 minutes and then released slowly. After the sample disc was removed from the mold and separated from the cauls and paper spacers, it was sintered at 380° C. for 30 minutes. The oven was then cooled to 290° C. at a rate of about 1° C./minute and the sample was removed. A crack-free rectangular sliver was cut so that the cross section was approximately square and the sliver was at least 6 cm. long. The dimensions was measured accurately and the cross-sectional area was calculated. The sample sliver was attached at each end to quartz rods by wrapping with silver-coated copper wire. The distance between wrappings was 4.0 cm. This quartz rod-sample assembly was placed in a columnar oven where the 4 cm test length was brought to a temperature of 380°±2° C., at which temperature the length became 4.32 cm. A weight was then attached to the bottom quartz rod to give a total weight suspended from the sample sliver of about 4 g. The elongation measurements vs. time were obtained, and the best average value for the creep curve in the interval between 30 and 60 minutes was measured. The melt viscosity was then calculated from the relationship $$\eta_{app} = (WL_t g)/3(dL_t/dt)A_T$$

wherein $\eta_{app}$ = (apparent) melt viscosity in shear, poises
$W$ = tensile load on sample, g
$L_t$ = length of sample (at 380° C.) cms (4.32 cm)
$g$ = gravitational constant, 980 $cm/sec.^2$
$(dL_t/dt)$ = rate of elongation of sample under load = slope of elongation vs. time plot, cm/sec.
$A_T$ = cross-sectional area of sample (at 380° C.), measured in $cm^2$ (area increases 37% at 380° C. over that at room temperature)

EXAMPLES

EXAMPLE 1

A horizontally disposed, cylindrical, stainless steel autoclave, having a capacity of 36,250 ml and a length-to-diameter ratio of about 1.5 to 1, and provided with a 4-bladed agitator running the length of the autoclave, was charged with 20.0 kg of demineralized water, 1000 g of paraffin wax, 30.7 g of (ammonium perfluorooctanoate) C-8 dispersing agent, and 1.33 g of DSP. At a temperature of 65° C., the autoclave was evacuated and purged with nitrogen, and 3.1 g of CTFE was precharged after the final evacuation. The autoclave was agitated and pressured to 8.0 $kg/cm^2$ (0.8 MPa) (113.5 psig) and heated to 85° C. An amount of 0.13 g APS initiator dissolved in 250 ml of water was added at 50 ml/min one hour after the addition of DSP. After kick-off, the pressure was maintained at 8.0 $kg/cm^2$ (0.8 MPa) until 8.4 kg of TFE had been reacted, and then the autoclave was vented and evacuated at 85° C. Two milliliters (3.1 g) of PPVE (perfluoropropylvinyl ether) and 30.9 g of CTFE were added and the autoclave was again agitated and pressured with TFE to 8.0 $kg/cm^2$ (0.8 MPa), at 85° C. An additional amount of 0.13 g APS dissolved in 250 ml of water was added at 50 ml/min to partly compensate for the decrease in the reaction rate due to the PPVE. After a total of 9.9 kg of TFE had been reacted, the autoclave was vented. The total polymerization time was 164 minutes.

The resulting dispersion was discharged from the autoclave, cooled, and the supernatant wax was removed. The dispersion had an RDPS of 0.175 micrometer and solid concentration of 34.4%. The dispersion was diluted to 15% solids with demineralized water, made basic with ammonia and agitated vigorously until it coagulated. After coagulation, it was agitated for an additional 5 minutes and then dried at 150° C. The resin had an SSG of 2.198 and a CTFE content of 0.23% and PPVE content of 0.0145% by infrared analysis. The extrusion pressure was 302 kg/cm$^2$ (30 Mpa) at 1600:1 reduction ratio.

Example 1 shows that the extrusion pressure of a CTFE modified polymer (Comparative Example 1) is lowered by incorporation of PPVE in the exterior of the polymer particles.

COMPARATIVE EXAMPLE 1

Example 1 was repeated using identical initiator amounts, except that no PPE was used. The polymerization time was 101 minutes.

The dispersion had an RDPS of 0.165 micrometer and solid concentration of 34.7%. The resin had an SSG of 2.203 and a CTFE content of 0.24%. The extrusion pressure was 482 kg/cm$^2$ (47 MPa).

EXAMPLE 2

The autoclave of Example 1 was used. The autoclave was charged with 20.0 kg of dimineralized water, 1000 g of paraffin wax, and 29.3 g of C-8 dispersing agent. At a temperature of 65° C., the autoclave was evacuated and purged with nitrogen, and 2.7 g of HFP was precharged after the final evacuation. The autoclave was agitated and pressurized with TFE to 8.0 kg/cm$^2$ (0.8 MPa) and heated to 85° C. DSP (4.0 g) and APS (0.26 g) dissolved in 500 ml of water were added at 50 ml/min. After kickoff, the pressure was maintained at 8.0 kg/cm$^2$ (0.8 MPa) until 7.4 kg of TFE had been reacted, and then the autoclave was vented and evacuated. Two milliliters (3.1 g) of PPVE and 38 g of HFP were added and the autoclave was again agitated and pressurized with TFE to 8.0 kg/cm$_2$ (0.8 MPa). After a total of 9.7 kg of TFE had been reacted, the autoclave was vented. The polymerization tie was 246 minutes.

The resulting dispersion was treated as in Example 1. The dispersion had an RDPS of 0.190 micrometer and solid concentration of 34.0%. The coagulated resin had an SSG of 2.211 and an HFP content of 0.13 weight percent. The PPVE content of the polymer could not be estimated quantitatively from the IR spectrum because of the close vicinity of its absorption band to the HFP absorption band. The extrusion pressure was 239 kg/cm$^2$ (23.4 Mpa) at 1600:1 reduction ratio.

Example 2 shows that the extrusion pressure of an HFP modified polymer (Comparative Example 2) is lowered by incorporation of PPVE in the exterior of the polymer particles.

COMPARATIVE EXAMPLE 2

Example 2 was repeated, except that no PPVE was used and the second HFP injection was made without vent-repressure. The polymerization time was 147 minutes.

The dispersion had an RDPS of 0.197 micrometer and solid concentration of 35.8%. The resin had an SSG of 2.215 and an HFP content of 0.14 weight percent. The extrusion pressure was 392 kg/cm$^2$ (38.4 Mpa).

I claim:

1. Non-melt-processible tetrafluoroethylene copolymer particles wherein the total comonomer content in the particle is between 0.001 and 2 weight percent, said copolymer consisting of a core and a shell portion wherein the comonomer in the core comprises recurring units of at least one comonomer selected from the class consisting of chlorotrifluoroethylene, dichlorodifluoroethylene, perfluoroalkenes of 3–7 carbon atoms, and mixtures thereof; and wherein the comonomer in the shell can comprise recurring units of at least one comonomer selected from the class described above and also contains recurring units of perfluoro(n-alkyl vinyl) ether of 3–7 carbon atoms; wherein the recurring units of perfluoro(n-alkyl vinyl) ether comprise between 0.0003 and 0.02 weight percent of the total copolymer particle; and provided that the total amount of comonomer units in the shell by weight is greater than the total amount in the core; and wherein the shell comprises between 5 and 50 weight percent of the particle.

2. The copolymer of claim 1 wherein the extrusion pressure of the polymer is between 225–400 kg/cm$^2$ at a reduction ratio of 1600:1 as measured by ASTM D1457-81A.

3. The copolymer of claim 1 or 2 wherein the perfluoro(n-alkyl vinyl) ether is perfluoro(n-propyl vinyl ether).

4. The polymer of claim 1 in an aqueous dispersion.

* * * * *